United States Patent

Sumiya et al.

[11] Patent Number: 5,908,503
[45] Date of Patent: Jun. 1, 1999

[54] LOW DEFECT DENSITY DIAMOND SINGLE CRYSTAL AND A PROCESS FOR THE PRODUCTION OF THE SAME

[75] Inventors: Hitoshi Sumiya; Naohiro Toda; Shuichi Satoh, all of Itami, Japan

[73] Assignee: Sumitomo Electric Industries. Ltd., Osaka, Japan

[21] Appl. No.: 08/567,428

[22] Filed: Dec. 5, 1995

[30]     Foreign Application Priority Data

| Dec. 5, 1994 | [JP] | Japan | 6-300595 |
| Oct. 9, 1995 | [JP] | Japan | 7-287972 |
| Nov. 30, 1995 | [JP] | Japan | 7-312579 |

[51] Int. Cl.$^6$ ................................................. C30B 29/04
[52] U.S. Cl. .............................. 117/79; 117/929; 423/446
[58] Field of Search ....................... 117/929, 70; 423/446

[56]               References Cited

U.S. PATENT DOCUMENTS

| 4,042,673 | 8/1977 | Strong | 117/929 |
| 4,125,770 | 11/1978 | Lang | 250/272 |
| 4,836,881 | 6/1989 | Satoh et al. | 117/929 |
| 5,328,548 | 7/1994 | Tsuji et al. | 117/929 |
| 5,419,276 | 5/1995 | Anthony et al. | 117/929 |
| 5,503,104 | 4/1996 | Spiro | 117/929 |

FOREIGN PATENT DOCUMENTS 0 509 759 A1  10/1992  European Pat. Off. .
0 603 995 A1  6/1994  European Pat. Off. .

OTHER PUBLICATIONS

H. Sumiya et al., "Development of High–Purity Synthetic Diamonds", Sumitomo Denki, No. 145, XP 000612898, pp. 113–117, 1994.

H. Sumiya et al., "Development of High–Purity Synthetic Diamonds", Sumitomo Electric Technical Review, No. 69, XP 000612899, pp. 69–73, Jan. 1995.

W. Banholzer et al., Thin Solid Films, vol. 212, Nos. 1/2, pp. 1–10, May 15, 1992.

*Primary Examiner*—Robert Kunemund
*Attorney, Agent, or Firm*—Wenderoth, Lind, & Ponack, L.L.P.

[57]                  ABSTRACT

A colorless, transparent low defect density, synthetic type IIa diamond single crystal, in which the etch pits due to needle-shaped defects are at most $3 \times 10^5$ pieces/cm$^2$, and which can be applied to uses needing high crystallinity of diamond, for example, monochromators, semiconductor substrates, spectroscopic crystals in X-ray range, electronic materials, etc., is provided by a process for the production of the colorless, transparent low defect density, synthetic diamond single crystal by growing new diamond crystal on a seed crystal of diamond by the temperature gradient method which comprises using a crystal defect-free diamond single crystal, as a seed crystal of diamond, and optionally subjecting to a heat treatment in a non-oxidizing atmosphere at a low pressure and a temperature of 1100 to 1600° C.

25 Claims, 3 Drawing Sheets

(S)

(a)

(b)

(c)

(d)

LOW DEFECT DENSITY DIAMOND SINGLE CRYSTAL AND A PROCESS FOR THE PRODUCTION OF THE SAME

BACKGROUND OF THE INVENTION

1. Field of the Invention

This invention relates to a high quality synthetic diamond single crystal substantially free from crystal defects, strains, etc., which can be applied to uses such as optical parts, spectroscopic crystals, monochromators, laser windows, anvils, semiconductor substrates, heat resistance semiconductors, device substrates for large power, and to a process for the production of the same.

2. Description of the Related Art

Diamond crystals can be applied to various uses such as heat sinks, dies for wire drawing, cutting tools for precision working, optical parts, laser windows and anvils for producing ultra-high pressures, because they have high hardness, high strength, excellent thermal conductivity, excellent corrosion resistance and good transmittance of lights.

Naturally occurring diamonds, most of which are called type Ia, contain about 1000 ppm of nitrogen. The nitrogen in this natural diamond is distributed in the crystal in an aggregated form, so that crystal defects and internal strains are large which results in the absorption of light due to nitrogen in the infrared range. Depending upon the variety of a rough stone, there is a large dispersion. Thus, the applied use has been limited to heat sinks or tools.

High purity natural diamond containing nitrogen impurity in an amount of at most several ppm is called type IIa and such diamond is very rare as represented by, for example, an output of about 2% based on the whole rough stones. Since the natural type IIa diamond contains very small amount of impurities, is colorless and transparent and has superior transmittance property, it has widely been applied to jewels, optical parts and laser window materials.

However, there remain defects or strains to a great extent in the interior part of the natural diamond, because of complicated growth progresses in the interior part of the earth. Accordingly, the natural diamond cannot be applied to uses requiring high crystallinity, for example, monochromators or semiconductor substrates. Furthermore, the natural diamond of type IIa has a problem that the output quantity is small resulting in higher production costs and difficulty in obtaining a supply of such diamonds.

An ordinary diamond artificially synthesized under an ultra-high pressure and high temperature is called type Ib and contains several hundreds ppm of nitrogen. Since this nitrogen is contained in the diamond crystal as an isolated substitutional impurity, absorption of light due to the nitrogen impurity occurs in the infrared range and ultraviolet range and the diamond crystal cannot be applied to optical parts or window materials. In addition, the distribution of nitrogen is largely uneven in the interior part of the crystal, thus resulting in more defects or strains in the crystal. The number of needle-shaped defects in the diamond single crystal is at least $10^6$ pieces/cm$^2$.

On the other hand, it is known that when a nitrogen getter such as Al or Ti is added to a solvent metal during synthesis of the diamond, the nitrogen in the diamond can be lowered to about several ppm. When the nitrogen getter is added to the solvent metal, however, inclusions in large amounts ordinarily tend to be taken in the crystal which largely decrease the production yield of a good quality crystal. Accordingly, the production cost of the synthetic type IIa diamond is higher than that of the natural type IIa diamond and as a result the production thereof has not been carried out on a commercial scale.

On the contrary, the inventors have found that an inclusion-free synthetic type IIa diamond having a nitrogen content of at most 0.1 ppm can stably be synthesized by using at least one element selected from Group IVa and Va elements having a high nitrogen removal efficiency as a nitrogen getter, which limits inclusions from being taken in the crystal.

Up to the present time, diamond has widely been used as jewels, grinding abrasives, heat sinks, sound vibration plates, etc. In addition thereto, of late, crystals for spectroscopy in the X-ray range or semiconductor diamond substrates have been highlighted as new uses. In these uses, diamond is used under such a state that the excellent properties of diamonds are raised to the utmost limits and to this end, a low defect density diamond crystal is required. The low defect density diamond is composed less in natural crystals. Since it has been reported that diamonds artificially synthesized at a high pressure, in particular, diamond called type IIa, containing a very small amount of impurity, nitrogen, has less defects, the above described artificial diamonds have often been used in such fields needing the low defect diamond. However, at the present time when such low defect density diamond is being required, a supply of these artificial diamonds with relatively low defects and having such crystallinity is very rare and thus expensive.

On the other hand, it is known that diamond is after-treated under various states so as to improve the quality of the diamond. For example, as an after-treatment of diamond crystal grains used as abrasives for grinding diamond wheels, it has been proposed to improve the surface of raw material abrasives by a hydrogen plasma treatment as disclosed in Japanese Patent Laid-Open Publication No. 107088/1987 or to improve the toughness by separating and removing inclusions and then heating at a reducing atmosphere as disclosed in Japanese Patent Laid-Open Publication No. 165494/1995.

For use of jewels, it is known that defects are incorporated in a crystal by irradiation of rays, neutron, electron, etc. and then subjected to a heat treatment at a temperature of 300 to 800° C. to impart various colors thereto ["Genshi-Ryoku Kogyo (Atomic Energy Industry)", Vol. 40 (1994), No. 7, page 71]. It is assumed that these treatments serve to restore a slight shift of carbon atom from the definite position by irradiation of electron ray. In the case of a large shift of carbon atom from the definite position, exemplified by strain, however, there is no example of the restoration.

On the other hand, there are some reports for the purpose of changing crystallinity for uses of electronic materials. For example, Japanese Patent Laid-Open Publication No. 277176/1990 describes a method comprising forming a ring crack on the surface of a diamond crystal by an indentation member of a breakage tester, then subjecting it to a hydrogen plasma treatment at 600° C. and thus providing a number of crystal defects on the diamond surface to increase the emission intensity; Japanese Patent Laid-Open Publication No. 24990/1993 describes a method comprising subjecting a diamond crystal to a hydrogen plasma treatment after an oxygen treatment and thus improving the interface with a metal formed thereon to form a good Schottky contact; Japanese Patent Laid-Open Publication No. 144995/1994 describes a method comprising heating a diamond crystal in an oxygen atmosphere and thus removing a chief cause of hindering the insulation without damaging the diamond; and Y. Mori: "Jpn J. Appl. Phys.", Vol. 31 (1992), L 1191 describes a method comprising implanting ion in the surface of a diamond crystal and then subjecting to a hydrogen plasma treatment to restore the breakage of the crystal when implanting ion. These examples aim at modifying only the surfaces of crystals and there is no example concerning improvement of crystallinity in the whole of a crystal.

Furthermore, it has been reported that diamond is deformed by heat-treating the diamond at a high temperature and high pressure, e.g. at least 7 GPa and at least 1000° C. It is known that carbon atoms making up diamond can sufficiently be removed according to this method.

In the treatment at such a high pressure, however, there arises a problem that not only an expensive high pressure apparatus is required, but also defects are again incorporated into a diamond crystal during the course of lowering the pressure and temperature to normal pressure and temperature.

Natural diamond has a number of defects or large strains in the interior part of the crystal. Natural type IIa diamond contains less impurities, but is not good as to the crystallinity such as defects, strains, etc. Thus, the natural type IIa diamond has a problem that it tends to be cracked during use and when applying to technical fields requiring the strength of such diamond, for example, an anvil for producing an ultra-high pressure, compression cell for FT-IR, laser window material, etc., it is readily broken in some cases. Further, it cannot be applied to a field reauiring high crystallinity, for example, monochomaters, semiconductor substrates, etc.

On the other hand, a synthetic diamond, in particular, single crystal synthesized by the so-called temperature gradient method is far superior in crystallinity than natural diamond. The crystallinities of various diamond were estimated by the FWHM (full width at hall maximum) of an X-ray diffraction rocking curve using Cu—Kα as a source to obtain results as shown in the following Table 1.

TABLE 1

FWHM of Rocking Curve of Various Diamonds

| Diamond | Quantity of Nitrogen (ppm) | FWHM of Rocking Curve (arcsec) |
| --- | --- | --- |
| Natural type Ia Diamond | ~1000 | 7–60 |
| Natural type IIa Diamond | <1 | 200–2500 |
| Synthetic type Ib Diamond | 10–120 | 6–20 |
| Synthetic type IIa Diamond | <0.1 | 4–6 |

Herein, FWHM of a rocking curve is obtained by measuring an X-ray diffraction intensity curve (rocking curve) by the double crystal method using a synthetic diamond crystal (004) as a first crystal and searching for FWHM of this curve. If there are a number of defects or strains in a crystal, the rocking curve is broadened and thus a small FWHM shows excellent crystallinity. It is apparent from Table 1 that both natural type Ia and type IIa diamonds have considerably more defects or strains and synthetic diamonds (synthesized by temperature gradient method) exhibit much higher crystallinity. Of synthetic diamonds, the synthetic type IIa can stably be obtained with high crystallinity because of being free from defects or strains due to nitrogen impurity.

Even in the case of the type IIa diamond synthesized by the temperature gradient method, however, the crystallinity is not complete and observing defects in the crystal by X-ray topography, a number of needle-shaped dislocation defects are found. The defect is one characteristic of the synthetic diamond, which also appears often in the synthetic type Ib diamond by the ordinary temperature gradient method. Because of the crystal defect, even the synthetic type IIa diamond cannot be applied to uses needing high crystallinity such as monochromators, semiconductor substrates, etc.

SUMMARY OF THE INVENTION

It is an object of the present invention to provide a high quality synthetic diamond single crystal with less defects or strains, whereby the disadvantages of the prior art can be overcome.

It is another object of the present invention to provide a process for the production of a transparent, high quality and good crystallinity synthetic diamond substantially free from impurities, crystal defects, strains, etc.

It is a further object of the present invention to provide a process for producing a low defect density synthetic diamond having a size of at least 0.1 carat, preferably at least 1 carat, which can effectively be applied to uses for electronic materials, in a relatively economical manner.

It is a still further object of the present invention to provide a process for the synthesis of a high quality and low defect density diamond single crystal having decreased needle-shaped defects and little strains.

These objects can be attained by a colorless, transparent low defect density, synthetic type IIa diamond single crystal, in which the etch pits due to needle-shaped defects are at most $3 \times 10^5$ pieces/cm$^2$ and a process for the production of the transparent low defect density synthetic diamond single crystal by growing new diamond crystal on a seed crystal of diamond by the temperature gradient method, which comprises using a crystal defect-free diamond single crystal as a seed crystal of diamond.

BRIEF DESCRIPTION OF THE DRAWINGS

The accompanying drawings are to illustrate the principle and merits of the present invention in detail.

DETAILED DESCRIPTION OF THE INVENTION

Figure 1:
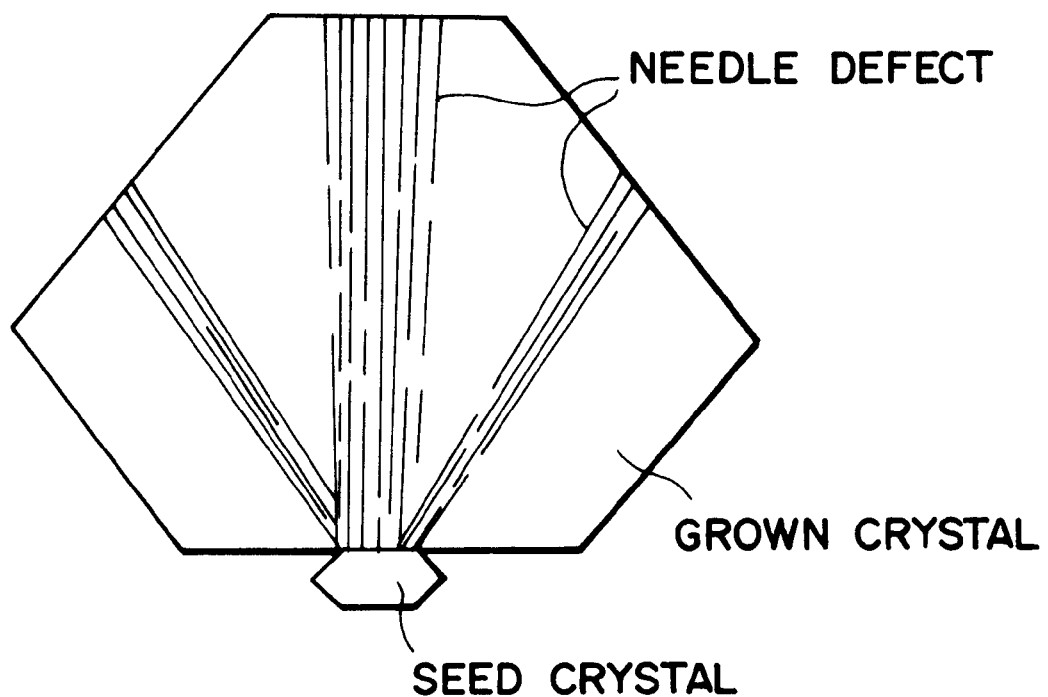
FIG. 1 is a schematic view of a distributed state of needle-shaped defects in the synthetic diamond crystal by the temperature gradient method.

The present invention is developed to solve the above described problems and thus provides a high quality synthetic diamond single crystal with lower defect density or strains, characterized by the following items:

(1) A colorless, transparent low defect density, synthetic type IIa diamond single crystal, in which the etch pits due to needle-shaped defects are at most $3 \times 10^5$ pieces/ cm$^2$.

(2) The colorless, transparent low defect density, synthetic type IIa diamond single crystal, as described in (1), wherein the size is at least 0.1 carat.

(3) The colorless, transparent low defect density synthetic type IIa diamond single crystal, as described in (1) or (2), wherein the crystal is applied to monochromators or semiconductor substrates.

(4) A process for the production of the colorless, transparent low defect density, synthetic diamond single crystal, in particular, with a low nitrogen content, by growing new diamond crystal on a seed crystal of diamond by the temperature gradient method, as described in any one of (1) to (3), which comprises using a crystal defect-free diamond single crystal, as a seed crystal of diamond.

(5) The process for the production of the colorless, transparent low defect density, synthetic diamond single crystal, as described in (4), wherein a diamond crystal free from crystal defects by X-ray topography is used as a seed crystal.

(6) A process for the production of the colorless, transparent low defect density, synthetic diamond single crystal by growing raw diamond crystal on a seed crystal of diamond by the temperature gradient method, as described in any one of (1) to (3), which comprises using a crystal defect-free diamond single crystal on at least the surface on which new diamond is grown, as a seed crystal of diamond.

(7) The process for the production of the colorless, transparent low defect density synthetic diamond single crystal, as described in (6), wherein a diamond crystal having no crystal defects by X-ray topography on at least the surface on which new diamond is grown is used as a seed crystal.

(8) The process for the production of the colorless, transparent low defect density, synthetic diamond single crystal, as described in (6), wherein a diamond crystal having no crystal defects by an etching test on at least the surface on which new diamond is grown is used as a seed crystal.

(9) A process for the production of the colorless, transparent low defect density, synthetic diamond single crystal by growing new diamond crystal on a seed crystal of diamond by the temperature gradient method, as described in any one of (1) to (3), which comprises using a crystal defect-free piece cut from a diamond single crystal synthesized by the temperature gradient method as a seed crystal of diamond.

(10) The process for the production of the colorless, transparent low defect density, synthetic diamond single crystal, as described in (9), wherein a diamond single crystal synthesized by the temperature gradient method is subjected to examination of the distributed state of crystal defects by X-ray topography and based on this examination result, a crystal defect-free part is cut from the diamond single crystal and used as a seed crystal.

(11) The process for the production of the colorless, transparent low defect-density, synthetic diamond single crystal, as described in (9), wherein a diamond single crystal synthesized by the temperature gradient method is cut in the form of a plate, subjected to examination of the distributed state of crystal defects on the surface thereof by X-ray topography and based on this examination result, a crystal defect-free part on the surface is cut from the diamond single crystal and used as a seed crystal.

(12) The process for the production of the colorless, transparent low defect density, synthetic diamond single crystal, as described in (9), wherein a diamond single crystal synthesized by the temperature gradient method is cut in the form of a plate, subjected to examination of the distributed state of crystal defects on the surface thereof by an etching test and based on this examination result, a crystal defect-free part on the surface is cut from the diamond single crystal and used as a seed crystal.

(13) A process for the production of the colorless, transparent low defect density, synthetic diamond single crystal by growing new diamond crystal on a seed crystal of diamond by the temperature gradient method, as described in any one of (1) to (3), which comprises using a strain-free diamond as a seed crystal of diamond.

(14) The process for the production of the colorless, transparent low defect density, synthetic diamond single crystal, as described in (13), wherein such a diamond that strain is not found in the crystal by observation using a polarizing microscope is used as a seed crystal.

(15) A process for the production of a low defect density, synthetic diamond single crystal which comprises heat-treating the low defect-density synthetic diamond single crystal obtained by the process described in any one of (4) to (14) in a non-oxidizing atmosphere at a low pressure and a temperature of 1100 to 1600° C.

(16) The process for the production of the low defect density, synthetic diamond single crystal, as described in (15), wherein the diamond single crystal before the heat-treatment is subjected to a treatment with hydrofluoric and nitric acid and/or the diamond single crystal after the heat-treatment is subjected to a treatment for removing graphite component.

(17) The process for the production of the low defect density, synthetic diamond single crystal, as described in (15) or (16), wherein the non-oxidizing atmosphere has an oxygen partial pressure of at most 10 Torr.

(18) The process for the production of the low defect density synthetic diamond single crystal, as described in any one of (15) to (17), wherein the nonoxidizing atmosphere is a plasma containing hydrogen.

(19) A process for the production of a low defect density, diamond single crystal, which comprises heat-treating a low defect diamond single crystal of at least 0.1 carat in a non-oxidizing atmosphere at a low pressure and a temperature of 1100 to 1600° C.

(20) The process for the production of a low defect density, diamond single crystal, as described in (19), wherein the diamond single crystal before the heat-treatment is a synthetic type IIa diamond single crystal and/or a synthetic diamond single crystal whose crystallinity is at most 5 times as large as the theoretical FWHM of the X-ray diffraction intensity curve.

(21) The process for the production of a low defect density, diamond single crystal, as described in (19) or (20), wherein the diamond single crystal before the heat-treatment is subjected to a treatment with hydrofluoric and nitric acid and/or the diamond single crystal after the heat-treatment is subjected to a treatment for removing graphite component.

(22) The process for the production of a low defect density, diamond single crystal, as described in any one of (19) to (21), wherein the non-oxidizing atmosphere has an oxygen partial pressure of at most 10 Torr.

(23) The process for the production of a low defect density, diamond single crystal, as described in any one of (19) to (22), wherein the non-oxidizing atmosphere is a plasma containing hydrogen.

(24) A low defect density, diamond single crystal produced by the process as described in any one of (19) to (23).

In the type Ib having hitherto been prepared on a commercial scale, there are a number of causes of deteriorating the crystallinity. Above all, uneven distribution of nitrogen as an impurity largely affects the crystallinity. So whichever single crystal is used as a seed crystal, the crystallinity is not so changed.

In the case of the high purity type IIa diamond, having higher crystallinity, on the other hand, there is no influence of nitrogen and accordingly, the crystallinity is deteriorated by another cause. As a result of the inventors' examinations or researches, it is found that needle-shaped defects constitute a main factor of deterioration of the crystallinity. Thus, the inventors have made various studies on the cause of needle-shaped defects and consequently, have found that the needle-shaped defects in a synthetic diamond by the temperature gradient method always come from a seed crystal part as a starting point. In FIG. 1 is shown a schematic state of needle defects obtained by observation using an X-ray topography. As a seed crystal, there has commonly been used a synthetic diamond for abrasives, having a diameter of about 500 $\mu$m. Such a granular diamond has been synthesized by a method called film growth method, whereby only small diamond grains of 500 $\mu$m are obtained, and the thus obtained diamond grains each consist of a single crystal having a clear self-shape and is used as a seed crystal. However, it has been rendered apparent by an experiment of X-ray topograph that this diamond has much more crystal defects than the diamond synthesized by the temperature gradient method. The crystal defect of the diamond grain used as a seed crystal is considered to be one of causes of generating needle-shaped defects in the synthetic crystal by the temperature gradient method as shown in FIG. 1.

Thus, the inventors have considered it effective to use a seed crystal with less defects for the purpose of reducing the needle-shaped defects and consequently, have found that when a defect-free part is cut out of a single crystal once synthesized by the temperature gradient method and used as a seed crystal, a type IIa diamond single crystal to synthesize, there can be obtained a low defect density and higher quality diamond having been synthesized up to the present time. The present invention is based on this finding.

Accordingly, the present invention provides a colorless, transparent low defect synthetic diamond single crystal, in which the etch pits due to needle-shaped defects are at most $3 \times 10^5$ pieces/cm$^2$, and a process for the production of the colorless, transparent low defect density, synthetic diamond single crystal by growing new diamond crystal on a seed crystal of diamond by the temperature gradient method, as described above, which comprises using a crystal defect-free diamond single crystal, as a seed crystal of diamond.

Estimation of the crystal defects in the seed crystal is preferably carried out by X-ray diffraction topography. In a diamond practically used as a seed crystal, there are various defects, for example, point defects such as pores, impurities, stacking faults, needle-shaped defects, dislocations, strains, etc. It is further found that by detecting these defects, through X-ray topography, a good quality crystal can be obtained.

There are some methods called "X-ray topography", but in this case, a method called Lang's method can be used, for example, by using Mo—K$\alpha$ as an X-ray and photographing a diffraction image of (220) plane or (111) plane of a diamond crystal by a Lang's camera. The defects which can be confirmed by this method, depending on a photographing device, are in a range of up to about 5 $\mu$m and the resolving power thereof can be maintained high in a range of up to about 1 $\mu$m.

A seed crystal having only a surface part (growth surface) rendered free from defects can sufficiently be used and the estimation of defects on the surface of the seed crystal can simply be conducted in view of occurrence state of etch pits by etching as another method other than the X-ray topography. Furthermore, the diamond single crystal synthesized by the temperature gradient method has partly a non-defect part which cannot be found in natural diamond and synthetic diamond grains by the film growth method and this non-defect part is preferably cut out for the use as a seed crystal. Before cutting, it is preferable to previously examine the distributed state of defects in the crystal or on the surface of the crystal by X-ray topography or etching test and based on the examination result, to cut a defect-free part out of the interior part or the surface of the crystal for use as a seed crystal. It is also effective to use the seed crystal containing no strain inside the crystal and the strain in the seed crystal can readily be examined by a polarizing microscope. The etching test is ordinarily carried out by etching a diamond crystal in a crucible of platinum, etc. using a fused salt of $KNO_3$, etc. as an etching agent at a temperature of 600 to 700° C. for several minutes to several hours and examining the presence or absence of etch pits on the crystal surface by the naked eye.

Figure 2:
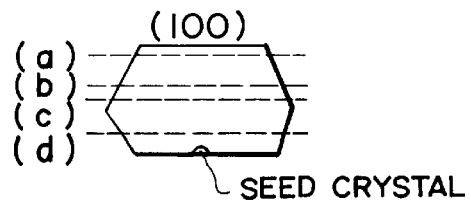
FIG. 2 (s) is a schematic view of cutting planes (a), (b), (c) and (d) in a cross-section of the synthetic diamond crystal along (100) plane and FIGS. 2 (a), (b), (c) and (d) are respectively distributed states of etch pits on the cutting planes.
Figure 2:
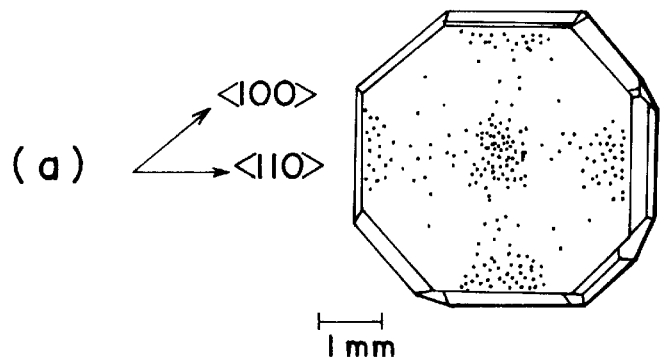
Figure 2:
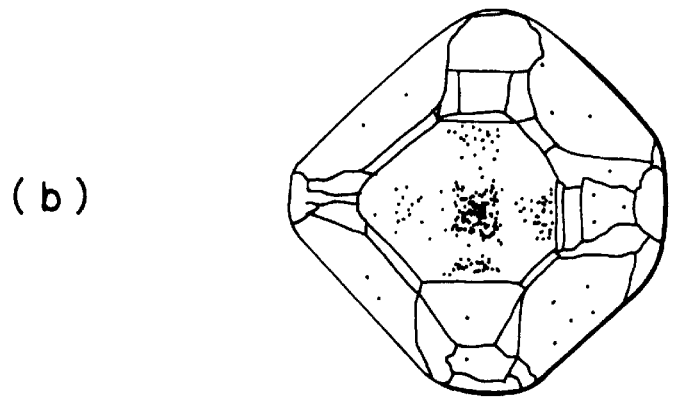
Figure 2:
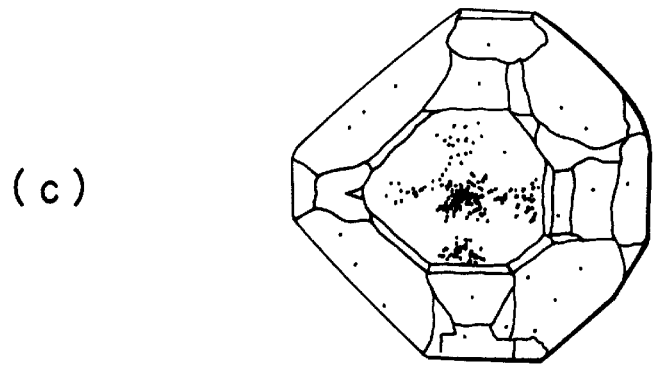
Figure 2:
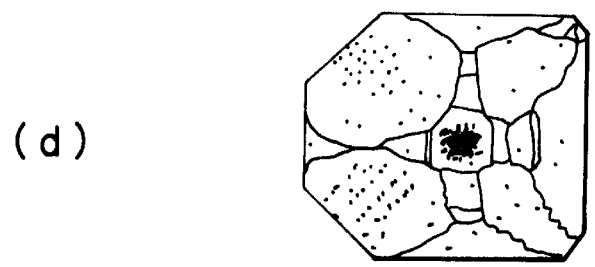

When a diamond sample is cut along A—A cross-section shown in FIG. 1 and immersed in the above described fused salt, the distributed state of etching pits is given as shown in FIG. 2 (*a*). The distributed states of etch pits on surfaces cut along cross-sections (a), (b), (c) and (d) in FIG. 2 (*s*) are shown in FIGS. 2 (*a*), (*b*), (*c*) and (*d*). The etch pits have the highest density in the central part and at the circumferential part. There are regularly arranged etch pits-enriched areas and etch pits-lean areas. It is herein to be noted that the density of etch pits just above the seed crystal is highest. The property of a low defect density, diamond single crystal is dependent on the density of etch pits on the above described high etch pit density area, i.e. etch pits-enriched area. In the present invention, therefore, the property of a diamond single crystal is generally estimated by the number of etch pits on the etch pits-enriched area. Thus, it is found that a diamond single crystal having etch pits in the range of at most $3 \times 10^5$ pieces/cm$^2$ can be applied to uses such as monochromators or semiconductor substrates.

As a method of improving the crystallinity of a single crystal, the single crystal has often been subjected to a heat treatment called annealing treatment. However, it has hitherto been considered in diamond that removal of defects or strains is difficult approximately under the atmospheric pressure because the bond energy among carbon atoms making up the diamond is larger.

However, the inventors have found, at the present time, that defects or strains included in diamond can partly be removed by carrying out a heating treatment in a non-oxidizing atmosphere at a temperature of 1100 to 1600° C. to raise the crystallinity and to obtain a diamond single crystal of at least 0.1 carat, excellent in crystallinity. This can be confirmed by reduction of FWHM of the diffraction intensity (hereinafter referred to as FWHM of X-ray) using the characteristic X-ray of molybdenum-K$\alpha_1$ line (wavelength 0.709 nm).

It is known that at a temperature of lower than 1100° C., a part of point defects is decreased, but the crystallinity is not so improved as confirmed by FWHM of X-ray. If the temperature exceeds 1600° C., the strains are somewhat decreased, but graphitization proceeds so that tie surface of the diamond is so roughened as to be incapable of practical use.

As the diamond to be used for this heat treatment, it is required that solid impurity of the solvent, which is called "inclusion", is not included therein as in the case of type IIa and it is preferable that FWHM of X-ray before the heat treatment is at most 5 times as large as the theoretical FWHM. Of course, the low defect density, diamond single crystal obtained by the foregoing synthesis process can be applied to this heat treatment whereby to obtain a good quality diamond single crystal with decreased needle-shaped defects and little strain. When solid impurities are present in a diamond crystal to be heat-treated, strains or defects are rather increased, centered on the impurity, after the heat treatment due to difference in thermal expansion. When exceeding 5 times as large as the theoretical FWHM, impurities are contained in the crystal in many cases and there are a great number of defects or strains, so that FWHM of X-ray is hardly changed even by the heat treatment.

FWHM of X-ray is used as a judgment standard of the crystallinity of diamond before the heat treatment. The kind of the X-ray used for measurement of FWHM is not particularly limited, but it is preferable to use an X-ray with a wavelength approximately equal to or shorter than that of the characteristic X-ray of molybdenum-$K\alpha_1$ line (wavelength 0.709 nm) because of decreasing the measurement error.

The atmosphere for carrying out the heat treatment should be a non-oxidizing atmosphere and the partial pressure of oxygen is preferably adjusted to at most 10 Torr. Other components than oxygen are not particularly limited, but for example, inert gases such as nitrogen, argon, etc. and plasma containing hydrogen are preferably used. When the partial pressure of oxygen exceeds 10 Torr, graphitization or etching of the diamond surface rapidly proceeds to result in a roughened surface or deformation of the crystal shape. This is not preferable for practical use.

Depending on the time for the heat treatment, a plasma by a hydrogen-containing gas hardly etches a diamond surface at the above described temperature range. On the other hand, it can be assumed that the use of such a plasma serves to prevent graphitization and to result in recrystallization of the surface.

A diamond single crystal to be subjected to the heat treatment is preferably treated with hydrofluoric and nitric acids and the heat treatment method is not particularly limited. For example, there are used methods by microwave plasma heating, high frequency induction heating, infrared irradiation heating, resistance heating, etc.

After the heat treatment, it is preferable to conduct a treatment for removal of graphite component, for example, by treatments using chromic acid, a mixed solution of hydrofluoric acid and nitric acid, hydrogen plasma at a low temperature, etc. Even if using the hydrogen plasma atmosphere, a partial graphitization occurs on the uppermost surface by heating at a high temperature some times and in this case, a diamond single crystal with improved crystalline property can be taken by removal of the graphite.

The following examples are given in order to illustrate the present invention in detail without limiting the same.

EXAMPLE 1

Figure 3:
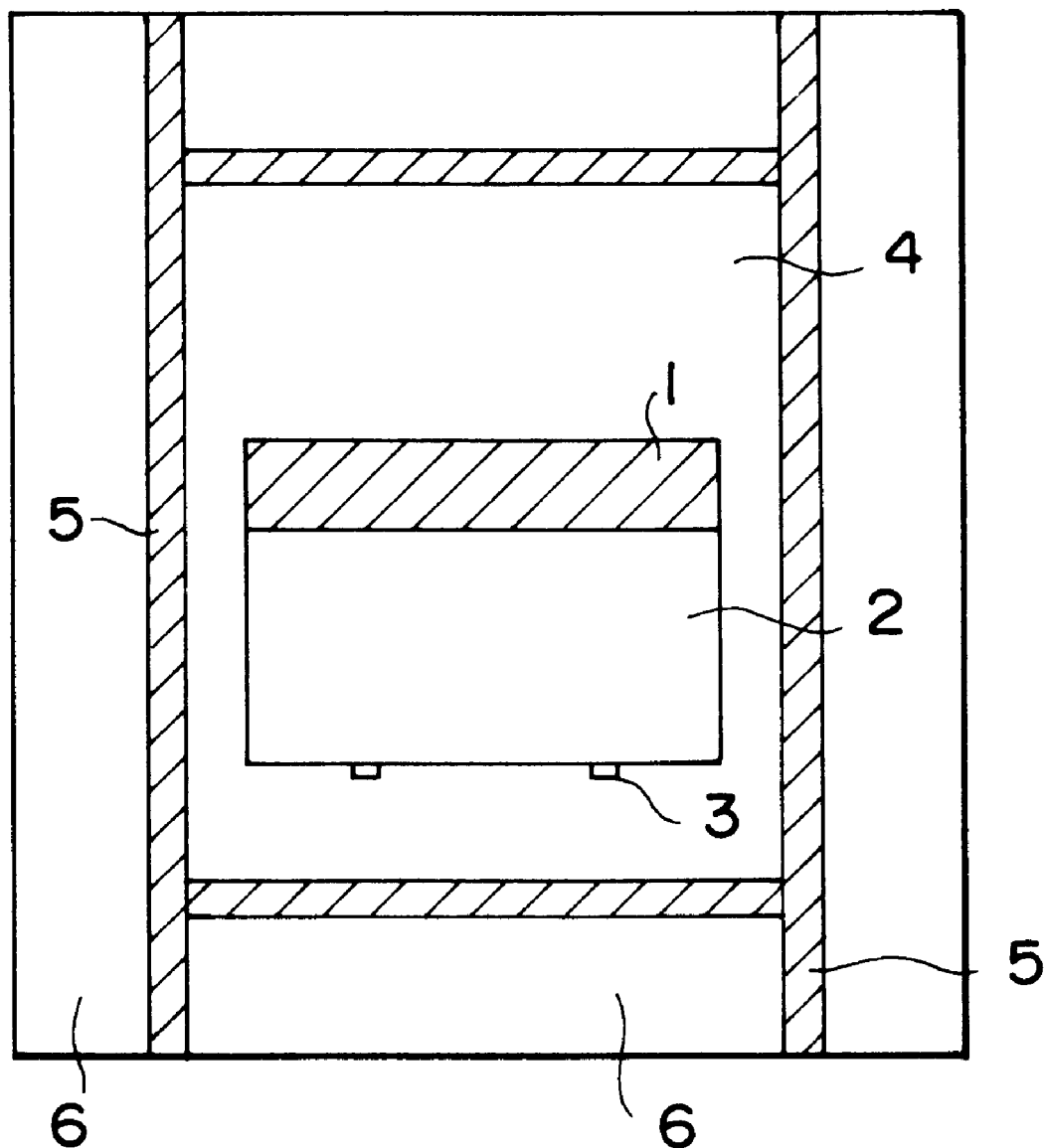
FIG. 3 is a schematic view of the structure of a sample chamber for the synthesis of a diamond single crystal by the temperature gradient method.

In FIG. 3 is shown a construction of a sample chamber (temperature gradient method) used for the synthesis of diamond. Synthetic diamond powder was used as a carbon source 1. High purity Fe and Co were used as a solvent 2 in a solvent proportion of Fe/Co=60/40 (by weight) and about 4% by weight of carbon was added to prevent solubilization of a seed crystal. Further, 1.5% by weight of Ti was added to the solvent as a nitrogen getter. The seed crystal 3, in which crystal defects were not found by observation by X-ray topography, was prepared by cutting a piece of 0.5×0.5×0.3 mm from a type Ib diamond single crystal having a size of about 1 carat (diameter 5 mm), synthesized by the temperature gradient method. A graphite heater 5 was set to provide a temperature gradient of about 30° C. between the carbon source and seed crystal part and the raw material was exposed to a pressure of 5.5 GPa and a temperature of 1300° C. for 70 hours in an ultra-high pressure producing apparatus, thus growing diamond. 6 designates a pressure medium in FIG. 3. Consequently, a colorless and transparent good quality diamond single crystal (IIa) of about 1 carat, substantially free from inclusions, was obtained. Measurement of the nitrogen content in the crystal by ESR showed the presence of nitrogen in an amount of at most 0.1 ppm. When the product was subjected to measurement of visible ray, ultraviolet and infrared ray spectra, there were no absorptions due to other impurities than diamond itself. When the resulting diamond was observed by means of a polarizing microscope to estimate strains, it was found that there were little strains. When FWHM of X-ray diffraction rocking curve (X-ray source Cu—$K\alpha$) by the double crystal method using the synthetic diamond crystal (004) plane as a first crystal was measured, it was 4.2 arcsec. Observation of defects in the crystal by X-ray topography taught that there were hardly any defects.

The diamond crystal was then immersed in a fused salt of potassium nitrate ($KNO_3$) at a temperature of 600 to 700° C. for 1 hour to count the number of etch pits formed on etch pits-enriched area, thus obtaining $2 \times 10^2$ pieces/$cm^2$.

EXAMPLE 2

A type Ib diamond crystal synthesized by the temperature gradient method was sliced in a thickness of 0.3 mm, distribution of needle-shaped defects was observed by X-ray topography and a crystal piece of 0.5×0.5 mm was cut from the defect-free area and used as a seed crystal. The other procedures were carried out in the similar manner to Example 1 to synthesize a type IIa diamond crystal. Consequently, a high quality type IIa diamond crystal, substantially free from defects and similar to Example 1, was obtained. The density of etch pits on etch pits-enriched area was $3 \times 10^2$ pieces/$cm^2$.

EXAMPLE 3

A type Ib diamond crystal synthesized by the temperature gradient method was sliced in a thickness of 0.3 mm and distribution of crystal defects was observed by X-ray topography. The sliced sample was treated with $KNO_3$ at 650° C. for 1 hour to etch the surface thereof. $3 \times 10^6$ pieces/$cm^2$ of etch pits were found on the area corresponding to the crystal defects observed by X-ray topography. A crystal piece of 0.5×0.5 mm was cut from the defect-lean area ($2 \times 10^3$ pieces/$cm^2$) and used as a seed crystal. The other procedures were carried out in the similar manner to Example 1 to synthesize a type IIa diamond crystal. Consequently, a defect-decrease, high quality type IIa diamond crystal, having a mean etch pit density of $5 \times 10^3$ pieces/$cm^2$, was obtained.

EXAMPLE 4

A type Ib diamond crystal synthesized by the temperature gradient method was sliced in a thickness of 0.3 mm and a crystal piece of 0.5×0.5 mm was cut from it. A sample, in which a transmission image due to strain was not found when observing by a polarizing microscope, was selected and used as a seed crystal. The other procedures were carried out in the similar manner to Example 1 to synthesize a type IIa diamond crystal. Consequently, a high quality type IIa diamond crystal, substantially free from defects, having a mean etch pit density of $2 \times 10^4$ pieces/cm$^2$, was obtained.

EXAMPLE 5

The low defect density, type IIa diamond crystal synthesized in Example 1 was sliced in a thickness of 0.3 mm, a crystal piece of 0.5×0.5 mm was cut from it and used as a seed crystal. The other procedures were carried out in the similar manner to Example 1 to synthesize a type IIa diamond crystal. Consequently, a high quality type IIa diamond crystal, substantially free from defects and similar to Example 1, having a mean etch pit density of $1 \times 10^2$ pieces/cm$^2$, was obtained.

Comparative Example

Example 1 was repeated except using a commercially available synthetic diamond (diameter 0.5 mm) for abrasives as a seed crystal to synthesize a type IIa diamond crystal for estimation. The resulting diamond was a colorless, transparent type IIa diamond single crystal, having a size of about 1 carat, nitrogen impurity content of at most 0.1 ppm and no absorption due to impurities in ultraviolet, visible and infrared spectra. However, in the observation of strains by the use of a polarizing microscope, there was found some strains. When FWHM of rocking curve was measured, it was 5.8 arcsec, showing that the crystallinity was not so good. In the observation of defects in the crystal by X-ray topography, a number of needle-shaped defects were found. The etch pit density on etch pits-enriched area was $5 \times 10^6$ pieces/cm$^2$.

EXAMPLE 6

A sliced sample of 1 mm×1 mm×0.5 mm from a type Ib diamond single crystal, having a size of about 1 carat, synthesized by the temperature gradient method, in which no crystal defect was found in the observation by X-ray topography, was chosen and subjected to etching in a fused salt of $KNO_3$. Thus, a sample having an etch pit density of about $5 \times 10^2$/cm$^2$ was used as a seed crystal. High purity Fe and Co were used as a solvent in a solvent proportion of Fe/Co=50/50 (by weight) and about 4% by weight of carbon was added to the solvent to prevent solubilization of the seed crystal. Further, 2.0% by weight of Ti was added to the solvent as a nitrogen getter.

Using an ultra-high pressure producing apparatus as shown in FIG. 3, the raw material was exposed to a pressure of 5.2 GPa and a temperature of 1320° C. for 60 hours thus growing diamond. Consequently, a colorless and transparent type IIa diamond single crystal, having a size of about 0.7 carat carat and with decreased needle-shaped defects, was obtained.

The resulting diamond crystal was heated in vacuum of $10^{-3}$ Torr at 1200° C. by microwave for 2 hours. The oxygen partial pressure was less than $10^{-3}$ Torr during the same time. The other procedures were carried out in the similar manner to the following Example 7 to prepare a sample for the estimation of crystallinity. The FWHM of the sample before the heat treatment was 1.8 arcsec., while FWHM of the sample after the heat treatment was 1.3 arcsec.

In this Example, there was obtained a good quality diamond single crystal with less needle-shaped defects and substantially free from strains, capable of being favorably applied to uses such as optical parts, spectroscopic crystals, monochromators, laser windows, anvils, semiconductor substrates, etc.

EXAMPLE 7

This example is given for showing an improvement of the crystallinity according to the present invention. Estimation of the crystallinity was conducted utilizing (004) plane diffraction of diamond. Using MoKα characteristic X-ray (wavelength 0.709 nm), the diffraction intensity curve by the double crystal method was measured to obtain FWHM. The theoretical FWHM by the double crystal method under the above described condition is about 1.0 arcsec. In addition, observation of strains by means of a polarizing microscope was carried out to obtain results shown in the following Table 2. Each of the samples used had a size of about 1 carat and was subjected to a heat treatment in an atmosphere of hydrogen, nitrogen or argon for 5 hours. The heating method was carried out using microwave plasma, resistance heating, etc. Each of the samples was washed with hydrofluoric and nitric acids before the heat treatment and subjected to a graphite removal treatment of the surface of a crystal with chromic acid after the heat treatment.

For comparison, the following samples were subjected to estimation of the crystallinity thereof:

1. Sample heated at 1000° C.
2. Sample heated at 1650° C.
3. Sample heat treated in an atmosphere whose oxygen partial pressure is 50 Torr.
4. Sample heated under such a state that solid impurities are contained.
5. Sample heated and not subjected to a graphite removal treatment. Table 2 shows the kind of a single crystal diamond, presence or absence of impurities contained therein and heat treatment conditions, as to each of samples.

Table 3 shows auxiliary treatments before and after the heat treatment, change of crystallinity by the heat treatment and the surface state.

TABLE 2

| Sample No. | Kind of Diamond | Impurity | Heat Treatment Conditions | | | | |
|---|---|---|---|---|---|---|---|
| | | | Heating Method | Temperature | Atmosphere | Total Pressure | Oxygen Partial Pressure |
| Example | | | | | | | |
| 1 | Art. IIa | no | Micro. | 1100° C. | $H_2$ | 120 Torr | $<10^{-3}$ Torr |
| 2 | Art. IIa | no | Micro. | 1200° C. | $H_2$ | 120 Torr | $<10^{-3}$ Torr |
| 3 | Art. IIa | no | Micro. | 1600° C. | $H_2$ | 120 Torr | $<10^{-3}$ Torr |

TABLE 2-continued

| Sample No. | Kind of Diamond | Impurity | Heat Treatment Conditions | | | | |
|---|---|---|---|---|---|---|---|
| | | | Heating Method | Temperature | Atmosphere | Total Pressure | Oxygen Partial Pressure |
| 4 | Art. Ib | no | Micro. | 1200° C. | $H_2$ | 120 Torr | $<10^{-3}$ Torr |
| 5 | Art. Ib | no | Micro. | 1500° C. | $H_2$ | 120 Torr | $<10^{-3}$ Torr |
| 6 | Art. IIb | no | Micro. | 1200° C. | $H_2$ | 120 Torr | $<10^{-3}$ Torr |
| 7 | Natu. Ia | no | Micro. | 1150° C. | $H_2$ | 120 Torr | $<10^{-3}$ Torr |
| 8 | Natu. Ia | no | Micro. | 1150° C. | $H_2$ | 120 Torr | $<10^{-3}$ Torr |
| 9 | Art. IIa | no | Micro. | 1100° C. | $H_2$ | 120 Torr | $<10^{-3}$ Torr |
| 10 | Art. IIa | no | Micro. | 1300° C. | $H_2$ | 120 Torr | 1 Torr |
| 11 | Art. IIa | no | Micro. | 1100° C. | $H_2$ | 120 Torr | $<10^{-3}$ Torr |
| 12 | Art. IIa | no | Micro. | 1200° C. | Ar | 120 Torr | $<10^{-3}$ Torr |
| 13 | Art. IIa | no | Resist. | 1200° C. | Air | $<10^{-3}$ Torr | $<10^{-3}$ Torr |
| 14 | Art. IIa | no | HF | 1200° C. | $N_2$ | 120 Torr | 5 Torr |
| Comparative Example | | | | | | | |
| 1 | Art. IIa | no | Micro. | 1000° C. | $H_2$ | 120 Torr | $<10^{-3}$ Torr |
| 2 | Art. IIa | no | Micro. | 1650° C. | $H_2$ | 120 Torr | $<10^{-3}$ Torr |
| 3 | Art. IIa | no | Micro. | 1200° C. | $H_2$ | 120 Torr | 50 Torr |
| 4 | Art. IIa | no | Resist. | 1200° C. | Air | 250 Torr | 50 Torr |
| 5 | Art. IIa | yes | Micro. | 1200° C. | $H_2$ | 120 Torr | $<10^{-3}$ Torr |
| 6 | Art. IIa | no | Micro. | 1200° C. | $H_2$ | 120 Torr | $<10^{-3}$ Torr |

(Note)
Art. IIa: artificial type IIa diamond
Natu. Ia: natural type Ia diamond
Micro.: microwave heating
Resist.: resistance heating
HF: high frequency induction heating

TABLE 3

| Sample No. | Auxiliary Treatment | | Measurement Results of Crystallinity | | | | |
|---|---|---|---|---|---|---|---|
| | | | Before Heat Treatment | | After Heat Treatment | | |
| | Before Heating | After Heating | FWHM (arcsec.) | Strain | FWHM (arcsec.) | Strain | Surface State |
| Example | | | | | | | |
| 1 | F.N. Acid | Chromic Acid | 2.4 | medium | 1.8 | little | flat |
| 2 | F.N. Acid | Chromic Acid | 2.7 | much | 2.2 | little | flat |
| 3 | F.N. Acid | Chromic Acid | 2.0 | little | 1.6 | no | flat |
| 4 | F.N. Acid | Chromic Acid | 3.1 | much | 2.5 | medium | flat |
| 5 | F.N. Acid | Chromic Acid | 5.0 | much | 4.2 | much | flat |
| 6 | F.N. Acid | Chromic Acid | 2.9 | much | 2.5 | medium | flat |
| 7 | F.N. Acid | Chromic Acid | 2.7 | medium | 2.3 | medium | flat |
| 8 | F.N. Acid | Chromic Acid | 3.7 | much | 3.3 | much | flat |
| 9 | F.N. Acid | Chromic Acid | 2.2 | little | 1.8 | no | flat |
| 10 | F.N. Acid | Chromic Acid | 2.4 | medium | 1.7 | no | flat |
| 11 | F.N. Acid | Chromic Acid | 2.0 | little | 1.4 | no | flat |
| 12 | F.N. Acid | Chromic Acid | 2.5 | medium | 2.2 | little | flat |
| 13 | F.N. Acid | Chromic Acid | 2.7 | much | 2.4 | medium | flat |
| 14 | F.N. Acid | Chromic Acid | 2.8 | much | 2.5 | medium | flat |
| Comparative Example | | | | | | | |
| 1 | F.N. Acid | Chromic Acid | 2.6 | much | 2.6 | little | flat |
| 2 | F.N. Acid | Chromic Acid | 2.9 | much | 2.4 | medium | roughened |
| 3 | F.N. Acid | Chromic Acid | 2.4 | medium | 2.7 | medium | roughened |
| 4 | F.N. Acid | Chromic Acid | 2.2 | little | 3.0 | little | roughened |
| 5 | F.N. Acid | Chromic Acid | 2.3 | medium | 9.5 | very much | flat |
| 6 | F.N. Acid | no | 2.0 | little | 2.2 | little | blackened |

(Note)
F.N. Acid: fluoric and nitric acids

As is evident from the results of Tables 2 and 3, in Sample Nos. 1 to 14 having been subjected to the heat treatment within the scope with the feature of the present invention, the crystallinity is improved and a part or all of strains are removed. In Comparative Sample Nos. 1 to 6 not provided with the feature of the present invention, there is no improvement of the crystallinity, but rather, defects are increased.

Advantages of the Invention

The synthetic diamond single crystal of the present invention, having few impurities and little crystal defects and strains, can be applied to uses requiring high crystallinity of diamond, for example, monochromators, semiconductor substrates, spectroscopic crystals in X-ray range, electronic materials, etc.

What is claimed is:

1. A process for producing a colorless, transparent low defect density synthetic type IIa diamond single crystal comprising growing the synthetic type IIa diamond single crystal on a seed crystal of diamond by the temperature gradient method, wherein the seed crystal of diamond is an internally and externally defect-free part cut from a diamond single crystal synthesized by the temperature gradient method.

2. The process for producing the synthetic type IIa diamond single crystal, as claimed in claim 1, wherein the internally and externally defect-free part is determined by X-ray topography or an etching test.

3. A process for producing a colorless, transparent low defect density synthetic type IIa diamond single crystal comprising growing the synthetic type IIa diamond single crystal on a seed crystal of diamond by the temperature gradient method, wherein the seed crystal of diamond is an internally and externally defect-free part cut from a diamond single crystal synthesized by the temperature gradient method.

4. The process for producing the synthetic type IIa diamond single crystal, as claimed in claim 3, wherein the internally and externally defect-free part is located by a X-ray topography examination of the distributed state of crystal defects of the diamond single crystal synthesized by the temperature gradient method.

5. The process for producing the synthetic type IIa diamond single crystal, as claimed in claim 3, wherein the internally and externally defect-free part is located by cutting the diamond single crystal synthesized by the temperature gradient method in the form of a plate and examining the distributed state of crystal defects internally and externally by X-ray topography or an etching test.

6. A process for producing a colorless, transparent low defect density synthetic type IIa diamond single crystal comprising growing the synthetic type IIa diamond single crystal on a seed crystal of diamond by the temperature gradient method, wherein the seed crystal is a strain-free diamond single crystal.

7. The process for producing the synthetic type IIa diamond single crystal, as claimed in claim 6, wherein the strain-free diamond single crystal is determined by observation using a polarizing microscope.

8. The process for producing the synthetic type IIa diamond single crystal, as claimed in claim 1, wherein the synthetic type IIa diamond single crystal is heat-treated in a non-oxidizing atmosphere at a low pressure and a temperature of 1100 to 1600° C.

9. The process for producing the synthetic type IIa diamond single crystal, as claimed in claim 3, wherein the synthetic type IIa diamond single crystal is heat-treated in a non-oxidizing atmosphere at a low pressure and a temperature of 1100 to 1600° C.

10. The process for producing the synthetic type IIa diamond single crystal, as claimed in claim 6, wherein the synthetic type IIa diamond single crystal is heat-treated in a non-oxidizing atmosphere at a low pressure and a temperature of 1100 to 1600° C.

11. The process for producing the synthetic type IIa diamond single crystal, as claimed in claim 8, wherein the synthetic type IIa diamond single crystal is treated with hydrofluoric acid and nitric acid prior to heat treatment or treated to remove graphite component after the heat treatment.

12. The process for producing the synthetic type IIa diamond single crystal, as claimed in claim 9, wherein the synthetic type IIa diamond single crystal is treated with hydrofluoric acid and nitric acid prior to heat treatment or treated to remove graphite component after the heat treatment.

13. The process for producing the synthetic type IIa diamond single crystal, as claimed in claim 10, wherein the synthetic type IIa diamond single crystal is treated with hydrofluoric acid and nitric acid prior to heat treatment or treated to remove graphite component after the heat treatment.

14. The process for producing the synthetic type IIa diamond single crystal, as claimed in claim 8, wherein the non-oxidizing atmosphere has a partial oxygen pressure of at most 10 Torr.

15. The process for producing the synthetic type IIa diamond single crystal, as claimed in claim 9, wherein the non-oxidizing atmosphere has a partial oxygen pressure of at most 10 Torr.

16. The process for producing the synthetic type IIa diamond single crystal, as claimed in claim 10, wherein the non-oxidizing atmosphere has a partial oxygen pressure of at most 10 Torr.

17. The process for producing the synthetic type IIa diamond single crystal, as claimed in claim 8, wherein the nonoxidizing atmosphere is a plasma containing hydrogen.

18. The process for producing the synthetic type IIa diamond single crystal, as claimed in claim 9, wherein the nonoxidizing atmosphere is a plasma containing hydrogen.

19. The process for producing the synthetic type IIa diamond single crystal, as claimed in claim 10, wherein the nonoxidizing atmosphere is a plasma containing hydrogen.

20. A process for producing a low defect density diamond single crystal, which comprises heat-treating a low defect density diamond single crystal of at least 0.1 carat in a non-oxidizing atmosphere at a low pressure and a temperature of 1100 to 1600° C.

21. The process for producing the diamond single crystal, as claimed in claim 20, wherein the diamond single crystal prior to heat-treatment is a synthetic type IIa diamond single crystal or a synthetic diamond single crystal whose crystallinity is at most 5 times as large as the theoretical FWHM of the X-ray diffraction intensity curve.

22. The process for producing the diamond single crystal, as claimed in claim 20, wherein the diamond single crystal is treated with hydrofluoric acid and nitric acid prior to heat-treatment or treated to remove graphite component after the heat-treatment.

23. The process for producing the diamond single crystal, as claimed in claims 20, wherein the non-oxidizing atmosphere has a partial oxygen pressure of at most 10 Torr.

24. The process for producing the diamond single crystal, as claimed in claims 20, wherein the non-oxidizing atmosphere is a plasma containing hydrogen.

25. A process for producing a colorless, transparent low defect density synthetic type IIa diamond single crystal comprising growing the synthetic type IIa diamond single crystal on a seed crystal of diamond by the temperature gradient method, wherein the seed crystal of diamond is an internally and externally defect-free part cut from a diamond single crystal synthesized by the temperature gradient method and wherein the internally and externally defect-free part is determined by X-ray topography or an etching test.

* * * * *